United States Patent [19]

Hirth et al.

[11] Patent Number: 4,880,685

[45] Date of Patent: Nov. 14, 1989

[54] PROCESS FOR SEPARATING AND/OR REACTING PARTICLES

[75] Inventors: Michael Hirth, Unterentfelden; Norbert Wiegart, Baden, both of Switzerland

[73] Assignee: BBC Brown Boveri AG, Baden, Switzerland

[21] Appl. No.: 128,271

[22] Filed: Dec. 3, 1987

[30] Foreign Application Priority Data

Dec. 10, 1986 [CH] Switzerland .......................... 4917/86

[51] Int. Cl.$^4$ ........................ B01D 47/00; B01J 8/00; C10H 23/00
[52] U.S. Cl. ................................ 423/210; 423/245.3
[58] Field of Search ...................... 423/245 S, 107, 97, 423/133, 88, DIG. 16, 108, 659, 44, 59, 76, 77, 134, 135, 149, 210; 75/25; 110/344, 345

[56] References Cited

U.S. PATENT DOCUMENTS

| | | |
|---|---|---|
| 1,973,590 | 9/1934 | Weator et al. ........................ 423/108 |
| 2,002,860 | 5/1935 | Levy ....................................... 423/153 |
| 2,608,472 | 8/1952 | Flosdorf et al. ........................ 23/264 |
| 2,675,889 | 4/1954 | Frey ....................................... 183/119 |
| 2,771,158 | 11/1956 | Bray et al. ............................. 182/122 |
| 2,855,287 | 10/1958 | Cyr ......................................... 423/108 |
| 2,966,232 | 12/1960 | Austin .................................... 183/34 |
| 3,179,497 | 4/1965 | Yanagase ................................ 55/72 |
| 3,395,512 | 8/1968 | Finney Jr. et al. ..................... 55/80 |
| 3,485,014 | 12/1969 | Atsukawa et al. ..................... 55/73 |
| 3,836,353 | 9/1974 | Holley ................................... 75/25 |
| 3,899,308 | 8/1975 | Petersson ............................... 55/8 |
| 3,981,967 | 9/1976 | Maiwald et al. ..................... 423/107 |
| 4,006,066 | 2/1977 | Sparwald .............................. 204/67 |
| 4,042,667 | 8/1977 | Ishiwata et al. ..................... 423/240 |
| 4,060,584 | 11/1977 | Hartmann et al. .................... 423/79 |
| 4,081,507 | 3/1978 | Dunn, Jr. ...................... 423/DIG. 16 |
| 4,092,152 | 5/1978 | Borbely ................................ 423/107 |
| 4,107,281 | 8/1978 | Reh et al. ................... 423/DIG. 16 |
| 4,215,101 | 7/1980 | Kriegel et al. ...................... 423/659 |
| 4,244,929 | 1/1981 | Lumsden et al. ................... 423/148 |
| 4,246,239 | 1/1981 | Dewey et al. .............. 423/DIG. 16 |
| 4,375,982 | 3/1983 | Chitil ..................................... 75/25 |
| 4,396,424 | 8/1983 | Yatsunami et al. ................. 423/97 |
| 4,402,932 | 9/1983 | Miller et al. .............. 423/DIG. 16 |
| 4,511,543 | 4/1985 | Keren et al. ......................... 423/107 |
| 4,620,492 | 11/1986 | Vogg et al. .......................... 110/345 |
| 4,662,899 | 5/1987 | Tandon ................................. 55/80 |
| 4,673,431 | 6/1987 | Bricmont ............................. 75/25 |
| 4,678,647 | 7/1987 | Lisowyj et al. ..................... 423/96 |
| 4,696,679 | 9/1987 | Albulescu et al. .................. 48/203 |
| 4,710,302 | 12/1987 | Pollert ................................ 210/696 |

FOREIGN PATENT DOCUMENTS

| | | | |
|---|---|---|---|
| 2107470 | 8/1972 | Fed. Rep. of Germany | .......... 75/25 |
| 2410372 | 9/1975 | Fed. Rep. of Germany | ........ 502/56 |
| 3514471 | 10/1986 | Fed. Rep. of Germany | . |
| 1140652 | 8/1957 | France | . |
| 55-3516 | 1/1980 | Japan | ................................... 110/345 |
| 56-68716 | 6/1981 | Japan | ................................... 110/345 |
| 55-221511 | 12/1984 | Japan | ................................... 110/345 |
| 7802095 | 8/1979 | Switzerland | . |
| 1110649 | 4/1968 | United Kingdom | . |

OTHER PUBLICATIONS

707 O.G. 312; 43 CCPA 884; 232 F. 2d 641; 109 USPQ 380, In re Edwards CNO. 6147).
International-Type Search Report Journal of Hazardous Materials, 12 (1985) 143–160, Elsevier Science Publishers B.V., Amsterdam—Printed in the Netherlands.

*Primary Examiner*—Gregory A. Heller
*Attorney, Agent, or Firm*—Burns, Doane, Swecker & Mathis

[57] ABSTRACT

In the separation and/or reaction of particles, these are heated together with a gaseous carrier medium. Constituents of these particles thus vaporize and form a mixture, while solid constituents remain.

A process is to be indicated which enables pollutants adsorbed on the particles to be separated off and/or reacted economically, without an uncontrolled release of residual pollutants to the environment. An apparatus for carrying out the process is also to be provided. This is achieved by mixing the particles and the carrier medium at controlled rates to give a fluidized blend. This blend is heated in a fluidized bed of a heating device in such a way that a mixture is formed. Immediately after the mixture has left the heating device, solid constituents of the mixture are precipitated and the remaining part of the mixture is then passed forward in a closed circulation.

7 Claims, 2 Drawing Sheets

4,880,685

PROCESS FOR SEPARATING AND/OR REACTING PARTICLES

TECHNICAL FIELD

The invention relates to a process for separating and/or reacting particles and to an apparatus for carrying out the process. In particular, it relates to a process for separating and/or reacting particles which contain at least one first substance vaporizable below a given temperature, at least one second substance which can be reacted below a second given temperature and at least one third substance, the particles being heated in a heating device together with a flowing gaseous carrier medium to the highest of the two given temperatures, the vaporizing first substance, of which there is at least one, reaction products of the converted second substance, of which there is at least one, the third substance, of which there is at least one, and the gaseous carrier medium forming a mixture which is then cooled. In particular, the invention also relates to an apparatus for carrying out this process, having a fan and a heating device operatively connected to a cooler, a dust precipitator having at least one stage, a hot-gas filter and a separator.

STATE OF THE ART

From the journal "Journal of Hazardous Materials", volume 12 (1985), pages 143 to 160, a process for separating and/or reacting particles is known. In this process, the particles, for example electrostatic filter dusts with adsorbed heavy metal compounds and adsorbed organic pollutants, are heated together with the gaseous carrier medium to comparatively high temperatures and separated into their constituents. The adsorbed heavy metal compounds thus vaporized, and the organic pollutants are converted into comparatively harmless gaseous and solid compounds. The vaporized heavy metal compounds and the reaction products of the converted organic pollutants form a mixture with the gaseous carrier medium. The solid constituents are collected and taken off for further processing or dumping. The remaining solid constituents are precipitated from the mixture, and the latter is then washed and free of residues. At the outlet of the washing installation, still contaminated gaseous carrier medium emerges, which is blown off through an activated carbon filter.

This process operates at very high temperatures, which has the consequence that even parts of the particles melt, which entails poor energy utilization. Moreover, the process does not operate in a closed circulation, so that certain undesired pollution of the environment cannot be excluded.

SUMMARY OF THE INVENTION

The invention is intended to remedy this situation. The invention as defined in the claims achieves the object of indicating a process for separating and/or reacting particles, which process enables pollutants adsorbed to the particles to be separated off and/or reacted economically without uncontrolled release of pollutant residues to the environment, and of providing an apparatus for carrying out the process, allowing economically advantageous operation.

The advantages achieved by the invention are to be seen essentially in the fact that less energy has to be supplied. Since the process operates at comparatively low temperatures, less temperature-resistant and therefore less expensive components of lower cost can be used in the apparatus according to the invention. It is also a great advantage that closed circulations with certainty prevent any uncontrolled release of pollutants to the environment.

The further embodiments of the invention are subjects of the dependent claims.

The invention, its further development and the advantages achievable by the invention are explained below by reference to the drawings which represent merely one development embodiment.

BRIEF DESCRIPTION OF THE DRAWINGS

In the drawings.

In all the figures, elements having the same action are provided with the same reference symbols.

ILLUSTRATIVE EMBODIMENTS OF THE INVENTION

Figure 1:
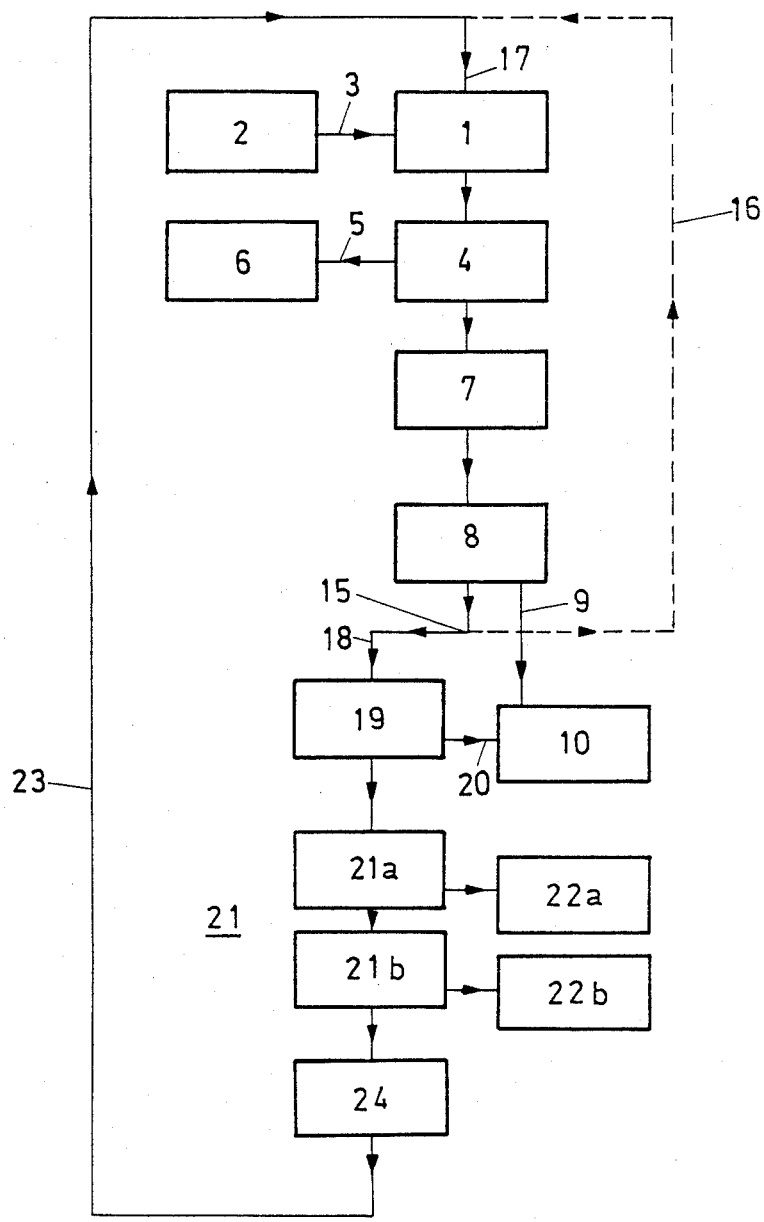
FIG. 1 shows a block diagram of the process according to the invention.

The block diagram in FIG. 1 shows the interaction of the various components important for the process. A fan 1 maintains the flow of a gaseous carrier medium. This carrier medium can be an oxidizing or reducing gas or it can consist of an inert gas. Any losses of carrier medium can be replaced from a reservoir vessel 2 via a connection 3. The stream of carrier medium passes from the fan 1 into a mixer 4 which is constructed, for example, as a rotary mixer or high-speed mixer. The outflow 5 from a charging bunker 6, which is filled with particles, is also introduced into this mixer 4. In the mixer 4, the particles are mixed at controlled rates with the flowing gaseous carrier medium to give a fluidized blend, which flows into a heating device 7. In a fluidized bed in this heating device 7, a first part of the constituents of the particles vaporizes, while a second part of the constituents of the particles is reacted to give gaseous and solid constituents, and a third part of these substances remains as solid constituents. These three parts together with the carrier medium form a mixture which leaves the heating device 7. This mixture is passed into a dust precipitator 8, wherein the predominant quantity of the remaining solid constituents of the mixture is precipitated and passed through a line 9 into a dust silo 10. The remaining part of the mixture, leaving the dust precipitator 8 and containing a small proportion of residues of the solid constituents of the mixture, is passed to a branch 15. At this branch 15, a first part of this remaining part of the mixture is branched off and recycled as a circulating stream through a line 16 to an intake 17 of the fan 1. A second part of this remaining part of the mixture is passed through the line 18 into a hot-gas filter 19 and is freed therein from residues of the solid constituents. The precipitated residues of the solid constituents are introduced through a line 20 into the dust silo 10. Downstream of the hot-gas filter 19, the remaining part of the mixture is introduced into a cooler 21 which can have several stages 21a, 21b with different cooling temperature levels. The vaporized constituents of the particles condense according to their specific condensation temperatures in the particular stages 21a 21b of the cooler and are collected in associated receivers 22a, 22b. The cooled, remaing part of the mixture leaves the cooler 21, enters a separator 24 and is recycled through a line 23 to the intake 17 of the fan 1.

In this block diagram according to FIG. 1, the line 16 for the circulating stream can also be omitted or isolated, if the composition of the particles allow this.

Figure 2:
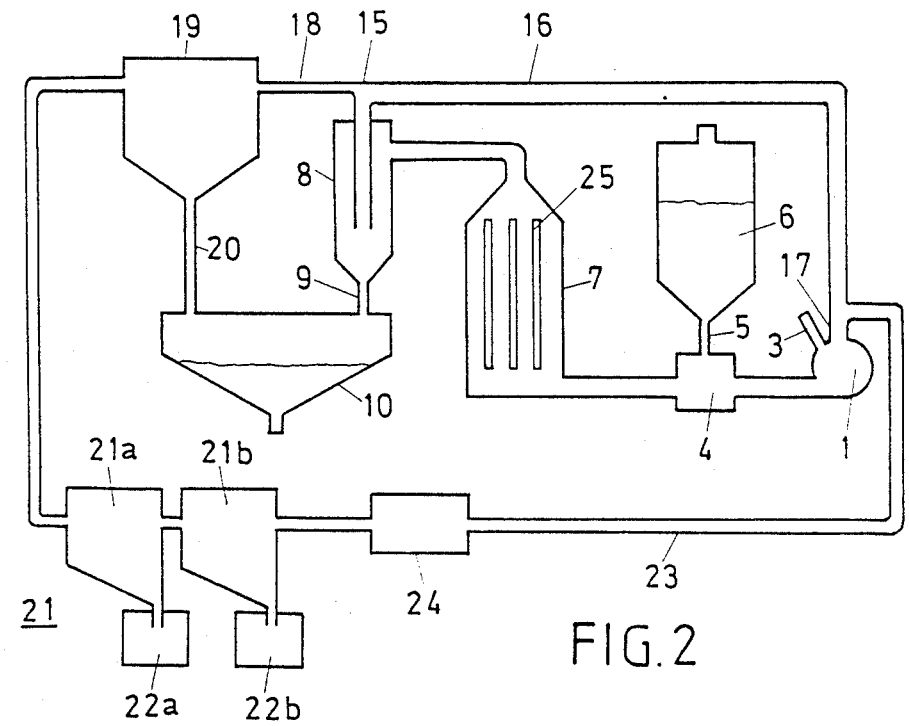
FIG. 2 shows a first diagrammatic illustration of an apparatus according to the invention and FIG. 3 shows a second diagrammatic illustration of an apparatus according to the invention.

FIG. 2 shows the apparatus which operates in accordance with the block diagram in FIG. 1. Controlling, regulating and metering instruments, sensors, charging devices, discharge devices and shut-off devices etc. which may be present, are here not shown in this diagrammatic illustration. Moreover heat insulations, which enclose the entire apparatus with the exception of the cooler 21 and the separator 24, have also been omitted. The connection 3 to the reservoir vessel 2 is only indicated. In the heating device 7, heater elements 25 are indicated which heat up the fluidized blend rising upwards. The heating elements 25 can be heated electrically or, for example, advantageously also by process heat such as arises in a refuse incinerator, in power stations or in cement works. The heating temperature can be selected from a few 100° C. up to the range of about 1200° C. to 1400° C. and can be adapted to those constituents of the particles which are to be vaporized. It is also conceivable to use a plasma burner, through which the blend flows, as the heat source. The heating device 7 is constructed such that the fluidized blend forms a fluidized bed therein. This has the result that this blend flows upwards through the heating device 7 in a controlled manner, so that all the particles are also heated uniformly. The mean residence time of the particles in the fluidized bed zone can be adapted to a particular composition of the particles.

The dust precipitator 8 is advantageously designed as single-stage or multi-stage cyclone. There must be no temperature gradient arising between the heating device 7, the dust precipitator 8 and the hot-gas filter 19, in order to ensure, that on the one hand, the vaporized constituents of the first part cannot be readsorbed on the particles and, on the other hand, the converted constituents of the second part cannot reform and then be bonded again to the remaining particles. Downstream of this dust precipitator 8, as a rule the predominant part of the mixture formed in the heating device 7 is recycled as a circulating stream at the branch 15 through the line 16 to the fan 1 and, at the latter, is fed again as a part of a carrier medium into the circulation. The remaining part of the mixture is passed through the line 18 into the hot-gs filter 19 which can be designed, for example, as an electrostatic filter or as a ceramic honeycomb filter. In this hot-gas filter 19, the residues of the solid constituent are removed from the remaining part of the mixture. This remaining part of the mixture is then introduced into the cooler 21 and cooled in several stages 21a, 21b. The levels of the cooling temperature are selected such that one defined fraction of the remaining part of the mixture is condensed at each level and is discharged as a liquid into the respective receiver 22a, 22b. Depending on the composition of the remaining part of the mixture, different cooling temperature levels can also be set. The cooler 21 cools the remaining part of the mixture to such an extent that all relevant vaporized substances are condensed and removed. The cooled, remaining part of the mixture leaving the cooler 21 is passed into a separator 24. In this separator 24, pollutants resulting from the reaction can, if necessary, be made harmless. At this point, for example, a wash of the cooled, remaining part of the mixture may be provided, or a conversion of the pollutants with the aid of catalysts, or even a combination of the two possibilities might be applied. The cooled, remaining part of the mixture, which leaves the separator 24 and can still have a residual heat content, is recycled to the fan 1 and, at the latter, fed again into the circulation.

If only slight traces of, for example, heavy metal should be present, these closed circulations prove to be particularly advantageous, since the respective heavy metal can be enriched in these circulations until it becomes possible to condense it.

Figure 3:
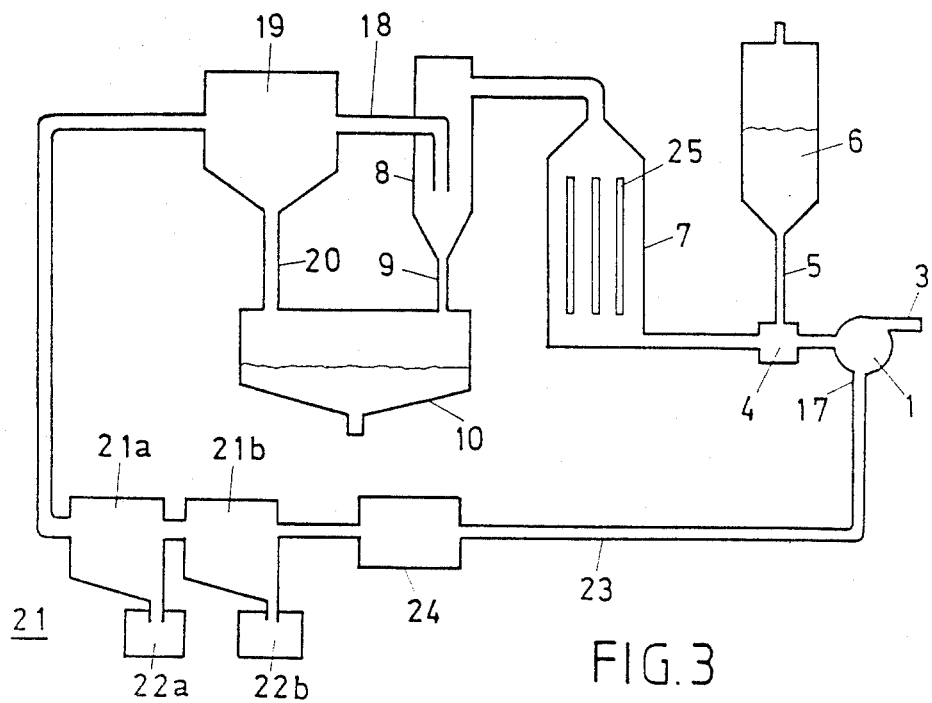

In FIG. 3, an apparatus is shown wherein, after the predominant quantity of the solid constituents of the mixture has been precipitated, the entire remaining part of the mixture is freed of residues of the solid constituents of the mixture and is then cooled as a whole. This apparatus results from the block diagram according to FIG. 1 if the line 16 for the circulating stream is omitted. All the other elements function in the same way as in the apparatus according to FIG. 2, but the hot-gas filter 19, the cooler 21 and the separator 24 must here have larger dimensions or be designed for higher output, if the apparatus is charged with the same quantities of particles. It is to be regarded as the advantage of this apparatus that particles of low contamination level can be purified rapidly and in large quantities.

Depending on the composition of the particles to be processed, it may be expedient to maintain the gaseous carrier medium under normal pressure, elevated pressure or reduced pressure and thus at the same time to cause the complete apparatus to operate under the most advantageous pressure conditions in each case. This of course requires appropriate constructional provisions such as, for example, pressure-tight locks at the outlet 5 of the charging bunker 6, at the outlet of the dust silo 10 and at the outlets of the individual stages 21a, 21b of the cooler 21. Moreover, the entire apparatus must be designed appropriately to withstand pressure. However, it is also conceivable to operate only the cooler 21 under an elevated pressure, in order to enable the condensation step to proceed, which would require the installation of an appropriate compressor.

The gaseous carrier medium can, attached to the particles to be processed contain an oxidizing or a reducing gas or a gas mixture, and it can also consist of an inert gas or gas mixture. If an oxidizing or reducing gas is used as the carrier medium or as an additive to the latter, provision is advantageously made in the line 23 for regenerating the oxidizing or reducing gas. If the apparatus corresponding to FIG. 2 is used, such a regeneration facility may also be provided in the line 16, if required.

The feasibility of the process described was confirmed by experiments. As the particles, dust from the filter system of a refuse incinerator with, inter alia, a cadmium content of 0.2% and a lead content of 3.25% was mixed with nitrogen as the carrier medium in the mixer 4 to give a fluidized blend. The flow velocity of this blend in the heating device 7 was set to about 50 cm/second. In the heating device 7, 1200° C. was measured as the temperature at the blend, and a minimum residence time of 2.4 seconds at this temperature was found. The purified dust taken out of the dust precipitator 8 and the hot-gas filter 19 did not show any detectable quantities of cadmium, and the lead content was less than 0.05%. The demonstrated, comparatively high temperatures and also the demonstrated minimum residence time are sufficient for reliable chemical conversion of organic pollutants such as, for example, dioxins or furans into compounds which are non-hazardous or can be rendered harmless without any problems. The dust fed, from the filter system of a refuse incinerator, very probably contains traces of dioxine, which had been simply and safely rendered harmless by this process.

The above illustrative example clearly shows that the filter dusts arising in a refuse incinerator can be freed of other dust pollutants and environmental poisons and can then be stored without problems in dumps or utilized for building purposes. The volume of waste, which has to be stored in special waste depositories or has to be rendered harmless in other ways, from such a unit can thus be substantially reduced, which entails large economic and ecological advantages. Pre-dried sewage sludge reduced to powder can also be freed of pollutants safely and economically by this process.

We claim:

1. A process for treating particles which comprises at least a heavy metal vaporizable at a first temperature, at least an organic pollutant which can be converted into gaseous and solid compounds at a second temperature and at least dust, which process comprises:

mixing the particles and a gaseous carrier medium into a mixture before their joint entry into a heating device at controlled rates to provide a fluidized blend;

heating the fluidized blend in a fluidized bed of the heating device to the higher of the first and second temperatures thus vaporizing the heavy metal and converting the organic pollutant;

retaining the dust in the form of particles in the mixture;

immediately after the mixture has left the heating device, before cooling of the mixture can take place, collecting a majority of the dust and solid compounds from the mixture; and then passing the remaining part of the mixture forward for mixing with the gaseous carrier medium so that the remaining part of the mixture is recycled through the process.

2. The process as claimed in claim 1, further comprising the steps of:

after the majority of the dust and the solid compounds from the mixture has been collected, freeing the mixture of further residues of the mixture constituents present in the form of solids; and cooling the mixture in stages.

3. The process as claimed in claim 1, wherein:

after the majority of the dust and solid compounds from the mixture has been collected, branching off a first portion of the mixture as a circulating stream for recycling and adding said first portion to the carrier medium; and freeing a second portion of the mixture of further residues of the mixture constituents present in the form of solids and then cooling said second portion in stages prior to recycling the cooled second portion by admixing said cooled second portion with the carrier medium.

4. The process as claimed in claim 1, wherein the gaseous carrier medium contains an oxidizing or reducing gas which reacts with the organic pollutant during the conversion of the latter.

5. The process as claimed in claim 2, further comprising the step of subjecting the mixture during cooling, to a high pressure in order to liquefy a portion of the vaporized heavy metal.

6. The process as claimed in claim 2, further comprising the step of freeing the cooled mixture of pollutants by washing.

7. The process as claimed in claim 2, further comprising the step of freeing the cooled mixture of pollutants by contacting the mixture with a catalyst.

* * * * *